(12) United States Patent
Hoffmann

(10) Patent No.: US 9,759,074 B2
(45) Date of Patent: Sep. 12, 2017

(54) WIND TURBINE ROTOR BLADE AND METHOD FOR INSTALLING A WIND TURBINE ROTOR BLADE

(75) Inventor: Alexander Hoffmann, Emden (DE)

(73) Assignee: Wobben Properties GmbH, Aurich (DE)

( * ) Notice: Subject to any disclaimer, the term of this patent is extended or adjusted under 35 U.S.C. 154(b) by 791 days.

(21) Appl. No.: 14/123,443

(22) PCT Filed: May 29, 2012

(86) PCT No.: PCT/EP2012/060054
§ 371 (c)(1),
(2), (4) Date: Jan. 8, 2014

(87) PCT Pub. No.: WO2012/163918
PCT Pub. Date: Dec. 6, 2012

(65) Prior Publication Data
US 2014/0127025 A1 May 8, 2014

(30) Foreign Application Priority Data
Jun. 3, 2011 (DE) ........................ 10 2011 076 937

(51) Int. Cl.
*F01D 5/30* (2006.01)
*F03D 13/10* (2016.01)

(52) U.S. Cl.
CPC ............... *F01D 5/30* (2013.01); *F03D 13/10* (2016.05); *F05B 2230/60* (2013.01); *F05B 2230/61* (2013.01); *F05B 2230/70* (2013.01); *Y02B 10/30* (2013.01); *Y02E 10/721* (2013.01); *Y02E 10/728* (2013.01); *Y02P 70/523* (2015.11); *Y10T 29/49336* (2015.01)

(58) Field of Classification Search
CPC ........ F03D 1/001; F03D 1/0633; F03D 1/005; F03D 1/065; F03D 13/00; F03D 13/40; F03D 13/10; F05B 2230/60; F05B 2230/61; B66C 23/185; B66C 23/207; B66C 1/108
See application file for complete search history.

(56) References Cited

U.S. PATENT DOCUMENTS

| 7,207,777 B2 | 4/2007 | Bervang |
| 7,353,603 B2 | 4/2008 | Wobben |
| 7,748,961 B2 | 7/2010 | Wobben |

(Continued)

FOREIGN PATENT DOCUMENTS

| CN | 1688808 A | 10/2005 |
| DE | 10225025 A1 | 12/2003 |

(Continued)

*Primary Examiner* — Justin Seabe
(74) *Attorney, Agent, or Firm* — Seed IP Law Group LLP

(57) ABSTRACT

There is provided a wind power installation rotor blade having a rotor blade root, a rotor blade tip, a rotor blade leading edge, a rotor blade trailing edge, a pressure side and a suction side. The rotor blade further has a rotor blade outer casing with at least one opening in the pressure and/or suction side for receiving handling means for fitting or removing the rotor blade. The rotor blade also has at least one fixing unit for fixing the handling means which are introduced through the at least one opening. The fixing unit is arranged in the interior of the rotor blade outer casing between the pressure side and the suction side.

12 Claims, 6 Drawing Sheets

(56) References Cited

U.S. PATENT DOCUMENTS

| | | | |
|---|---|---|---|
| 7,832,987 B2 * | 11/2010 | Haarh | B66C 1/108 |
| | | | 416/146 R |
| 7,883,319 B2 | 2/2011 | Volkmer | |
| 8,083,212 B2 * | 12/2011 | Numajiri | B66C 1/108 |
| | | | 254/278 |
| 2011/0057158 A1 | 3/2011 | Von Kessel et al. | |
| 2012/0027561 A1 | 2/2012 | Riddell et al. | |
| 2013/0236324 A1 | 9/2013 | Bech et al. | |
| 2014/0127025 A1 | 5/2014 | Hoffmann | |
| 2014/0245580 A1 | 9/2014 | Meyer et al. | |

FOREIGN PATENT DOCUMENTS

| | | |
|---|---|---|
| DE | 103 05 543 A1 | 8/2004 |
| DE | 102007043426 A1 | 3/2009 |
| DE | 20 2010 002 679 U1 | 7/2010 |
| DE | 202010003033 U1 | 7/2010 |
| DE | 102011076937 B3 | 12/2012 |
| DE | 102011084140 A1 | 4/2013 |
| KR | 200407842 Y1 | 2/2006 |
| RU | 2 361 113 C2 | 7/2009 |
| WO | 03/100249 A1 | 12/2003 |
| WO | 2005/071261 A1 | 8/2005 |
| WO | 2007/033671 A1 | 3/2007 |
| WO | 2012034566 A1 | 3/2012 |
| WO | 2013050569 A2 | 4/2013 |

* cited by examiner

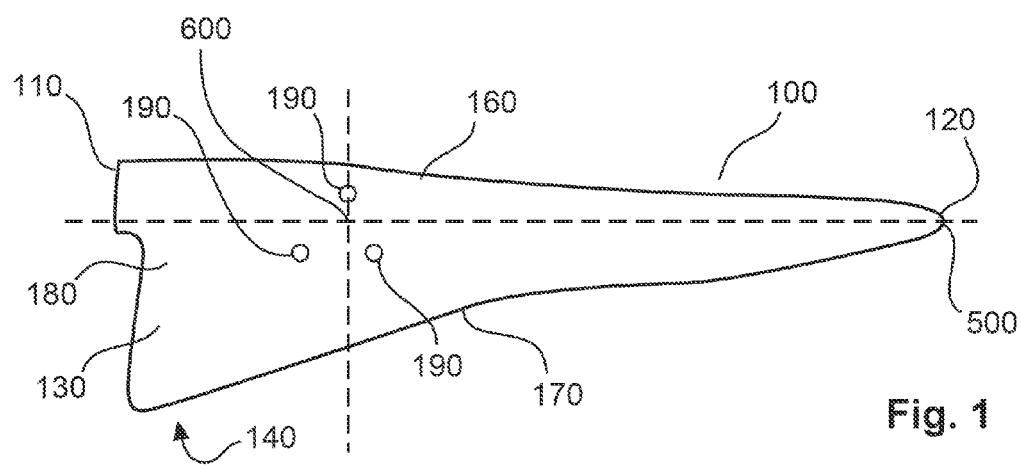
Fig. 1
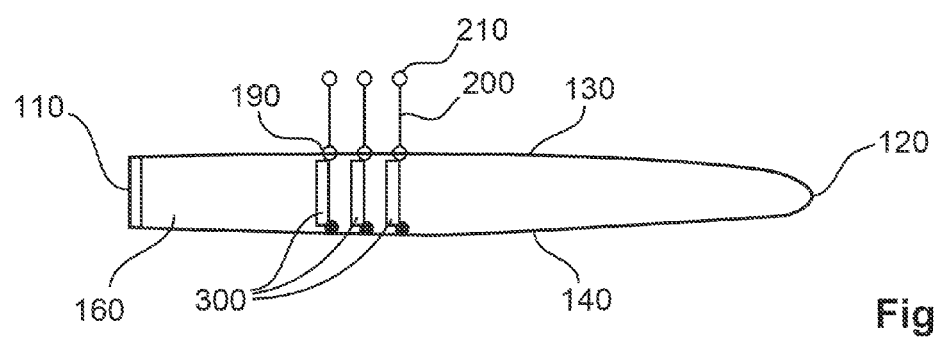
Fig. 2
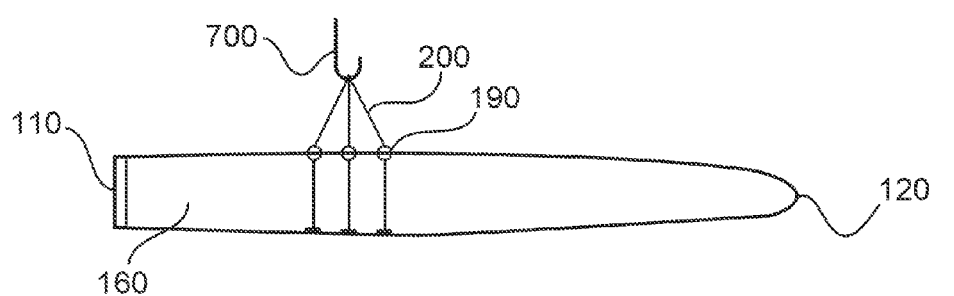
Fig. 3
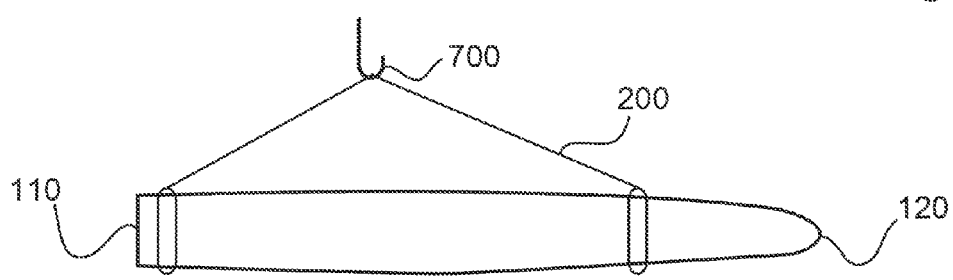
(PRIOR ART)  Fig. 4

WIND TURBINE ROTOR BLADE AND METHOD FOR INSTALLING A WIND TURBINE ROTOR BLADE

BACKGROUND

Technical Field

The present invention concerns a wind power installation rotor blade and a method of fitting a wind power installation rotor blade.

Description of the Related Art

Various technologies are known for fitting and removing rotor blades. Typically the rotor blade is fitted and removed by means of a crane. For that purpose handling means or slings are provided in the region near the rotor blade root and in the region of the rotor blade tip. Those slings are then fixed to a crane hook to be able to convey the rotor blade. Alternatively a method of fitting rotor blades is also known, in which the rotor blades have one or more two through holes which serve to receive handling means. In the known methods of fitting and removing rotor blades of a wind power installation the rotor blade is typically fitted or removed in a vertically oriented position.

DE 20 2010 002 679 U1 shows a rotor blade of a wind power installation with an arcuate deflection member for deflecting a cable for fitting the rotor blade.

DE 103 05 543 A1 shows a rotor blade of a wind power installation with a through hole for fitting the rotor blade.

BRIEF SUMMARY

One or more embodiments of the present invention are directed to a wind power installation rotor blade which permits improved fitment and removal.

One embodiment is directed to a wind power installation rotor blade having a rotor blade root, a rotor blade tip, a rotor blade leading edge, a rotor blade trailing edge, a pressure side and a suction side. The rotor blade further has a rotor blade outer casing with at least one opening in the pressure and/or suction side for receiving handling means for fitting or removing the rotor blade. The rotor blade also has at least one fixing unit for fixing the handling means which are introduced through the at least one opening. The fixing unit is arranged in the interior of the rotor blade outer casing between the pressure side and the suction side.

According to an aspect of the invention a first end of the introduced handling means is fixed at a first end of the fixing unit for example by means of a bolt. The first end of the fixing unit is fixed to the side of the rotor blade, that is opposite to the opening.

In an aspect of the invention there are provided at least three openings in the rotor blade outer casing around the region of the center of gravity of the rotor blade.

In an aspect of the invention the handling means represent soft slings for example of glass-fiber reinforced plastic (GRP) or carbon-fiber reinforced plastic (CRP).

In a further aspect of the invention the opening is closable from the interior after fitment of the rotor blade has been effected.

In a further aspect of the invention the rotor blade outer casing, in the region of the at least one opening and the fixing units, is of such a large size that a man can creep therethrough.

In a further aspect of the invention the fixing unit has a first and a second end, wherein provided at the first end and the second end is a respective reinforcing plate which is bonded from the interior in or to the pressure side or the suction side.

In a further aspect of the invention the fixing unit is of a symmetrical configuration and has a first and a second hole which are suitable for receiving a bolt for fixing an end of the handling means.

One embodiment of the invention further concerns a method of fitting wind power installation rotor blades. In this embodiment a first rotor blade is lifted to the pod of the wind power installation by means of a crane and a handling means, for example three handling means, which according to one embodiment of the invention are fixed to the fixing unit within the rotor blade. Then the rotor blade is fitted to the pod and the rotor blade is lowered, wherein the three slings are still fixed to the crane hook. In the lowered condition the rotor blade is still held by the crane. A second rotor blade can then be lifted to the pod by means of a second crane and fitted there. It is only after the second rotor blade has been completely fitted that the handling means in the first rotor blade are removed.

Another embodiment of the invention concerns the notion of fitting or removing in particular larger rotor blades no longer in a vertically oriented position but in a horizontally oriented position. That is advantageous because the surface area on which the wind can act is reduced. The embodiment further concerns the idea of being able to release the handling means required for fitting the rotor blades, without a fitter having to negotiate the fitted rotor blade, from the outside, which for example is generally completed by a person located in a basket on a crane. Rather the embodiment concerns the idea of fixing the handling means in the interior of the rotor blade so that the handling means can also be removed again in the interior of the blade. That can be effected for example by a bolt which can be removed after fitment of the rotor blade has been effected. Then the handling means (for example slings) can be removed through the opening. None of the fitters has to go to the outside of the rotor blade for that purpose. The fixing unit for fixing the introduced handling means is preferably so adapted that it extends from the pressure side to the suction side of the rotor blade.

Further configurations of the invention are subject-matter of the appendant claims.

BRIEF DESCRIPTION OF THE SEVERAL VIEWS OF THE DRAWINGS

Advantages and embodiments by way of example of the invention are described in greater detail hereinafter with reference to the drawing.

FIG. 1 shows a diagrammatic plan view of a wind power installation rotor blade according to a first embodiment, FIG. 2 shows a diagrammatic sectional view of the wind power installation rotor blade according to the first embodiment, FIG. 3 shows a further diagrammatic sectional view of the wind power installation rotor blade according to the first embodiment, FIG. 4 shows a diagrammatic sectional view of a rotor blade according to the state of the art.

DETAILED DESCRIPTION

Figure 5:
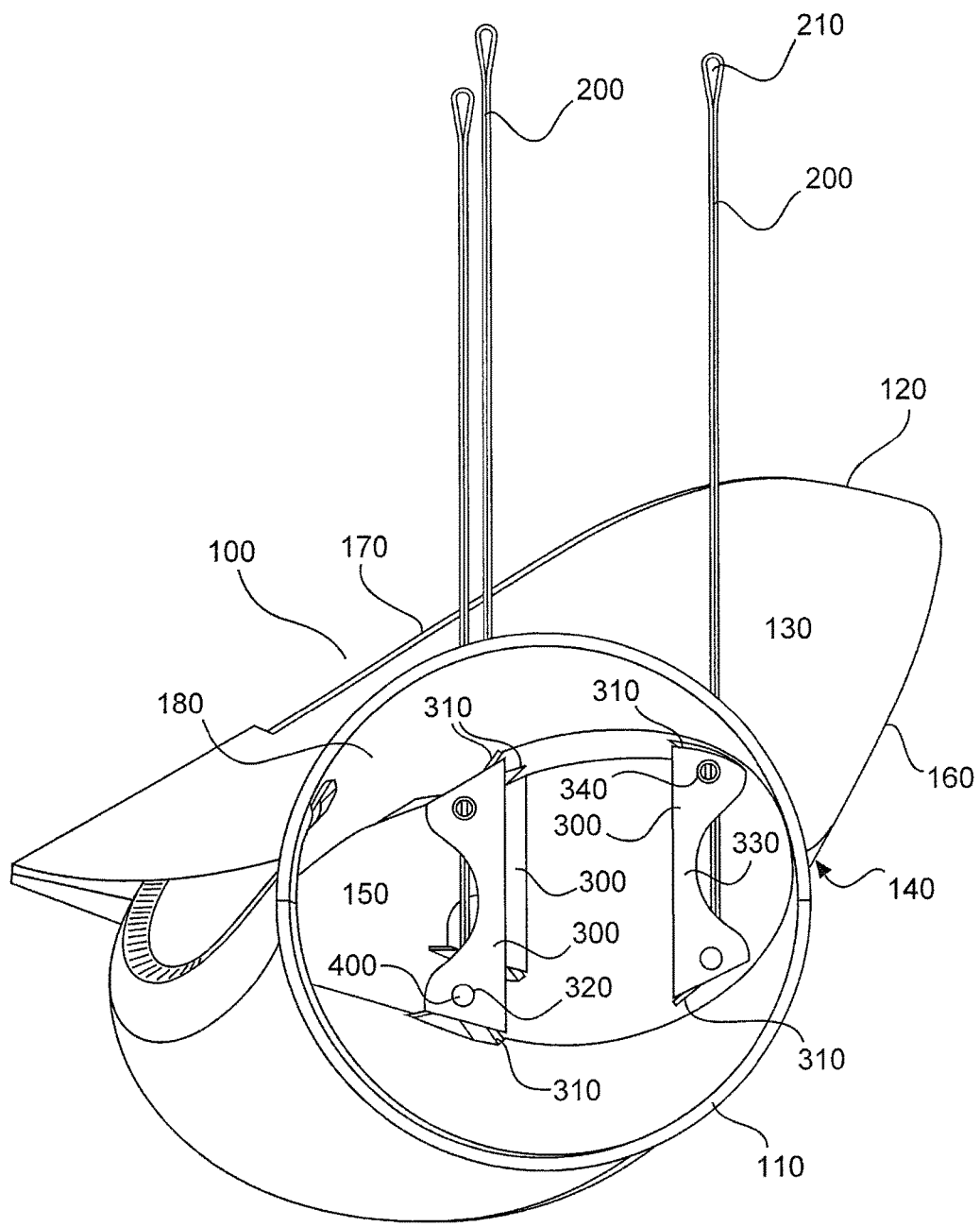
FIG. 5 shows a plan view of a wind power installation rotor blade according to the second embodiment.

FIG. 1 shows a diagrammatic plan view of a wind power installation rotor blade according to a first embodiment. The wind power installation rotor blade 100 has a rotor blade root 110, a rotor blade tip 120, a rotor blade leading edge 160, a rotor blade trailing edge 170, a suction side 130, a pressure side 140, a rotor blade outer casing 180 and openings 190 in the suction side 130 and/or the pressure side 140. Optionally three openings 190 can be provided.

The rotor blade 100 has a rotor blade longitudinal direction 500. The three openings 190 can preferably be provided in or around the region of the center of gravity 600. In that way the rotor blade can be fitted in a horizontally oriented position. The surface area on which the wind can act can thus be reduced.

FIG. 2 shows a diagrammatic sectional view of the wind power installation rotor blade according to the first embodiment. The rotor blade 100 has a rotor blade root 110, a rotor blade tip 120, a suction side 130, a pressure side 140, a rotor blade leading edge 160 and for example three openings 190 in the outer casing 180 on the suction side or pressure side which are provided in or around the region of the center of gravity 600. In addition thereto there can also be three openings on the other of the pressure side or the suction side. For example three fixing units 300 are provided between the suction side 130 and the pressure side 140. Handling means for example in the form of slings 200 can be introduced through the openings 190 into the interior of the rotor blade and fixed by means of the fixing units 300.

At their free ends the handling means 200 have an eye 210 which can be fitted over a crane hook 700 (see FIG. 3) so that the rotor blade can be fitted in position or removed.

FIG. 4 shows a diagrammatic sectional view of a rotor blade according to the state of the art. The rotor blade has a rotor blade root 110 and a rotor blade tip 120. The handling means for example in the form of slings 200 can be slung around the rotor blade and then fixed to the crane hook 700.

From the comparison between the rotor blades in FIG. 3 and FIG. 4, it can be seen immediately that the rotor blade can have handling means in the form of slings 200 which are substantially shorter than in the case of the rotor blade in accordance with the state of the art in FIG. 4. That also has the consequence that the crane required for fitting or removing the rotor blade can be smaller.

The end to be fixed of the handling means or slings 200 is fixed on the side of the rotor blade, that is opposite to the openings 190. That is particularly advantageous in regard to better distribution of load when fitting and removing the rotor blade.

FIG. 5 shows a plan view of a wind power installation rotor blade according to a second embodiment. In particular the plan view in FIG. 5 shows a view onto the rotor blade root region of the rotor blade. The rotor blade has a rotor blade root 110, a rotor blade tip 120, a rotor blade leading edge 160, a rotor blade trailing edge 170, a suction side 130, a pressure side 140 and an outer casing 180. The rotor blade is at least partially hollow in its interior 150 so that fixing units 300 can be fixed to the outer casing 180 between the suction side 130 and the pressure side 140. In addition provided on the pressure side 140 are three openings 190 through which the slings 200 can be introduced into the interior 150 of the rotor blade. The slings are then fixed to a fixing unit 300 by means of a fastener, such as a bolt 400.

The fixing unit 300 has two reinforcing plates 310 at its two ends. The fixing unit is fixed to the outer casing 180 by means of the reinforcing plates 310 and fasteners. The fixing units 300 have a first and a second opening 320, 340. In the case shown in FIG. 5 a bolt is introduced into the first hole 320 and through the sling 200 to releasably fix the slings 200. That provides that the distribution of load or force is applied to or provided in the downwardly facing side (the suction side 130 in FIG. 5).

In its central region the fixing unit 300 has a recess portion 330.

Figure 6:
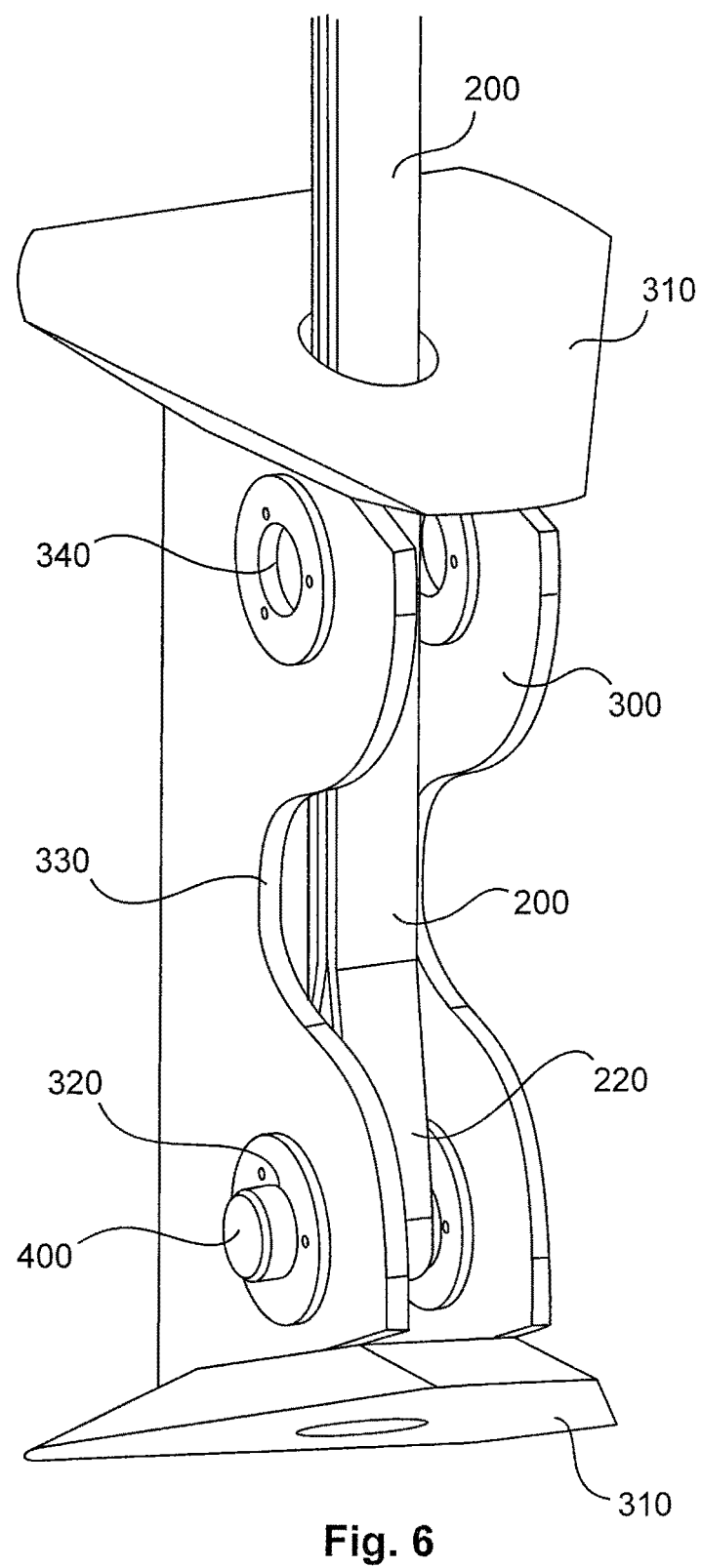
FIG. 6 shows a perspective view of a fixing unit and a handling means according to the second embodiment.

FIG. 6 shows a perspective view of the fixing unit for a rotor blade according to the second embodiment. The fixing unit has two reinforcing plates 310, a first and a second opening 320, 340 and in the central region a recess portion 330. The sling 200 has a first eye 210 for receiving a crane hook and a second eye 220 which serves for fixing to the fixing unit. The sling 200 is fixed to the fixing unit by introducing the bolt 400 through the first opening 320 of the fixing unit 300 and through the eye 220 of the sling 200.

A recess portion is provided in the central region of the fixing unit between the first and second opening.

Figure 7:
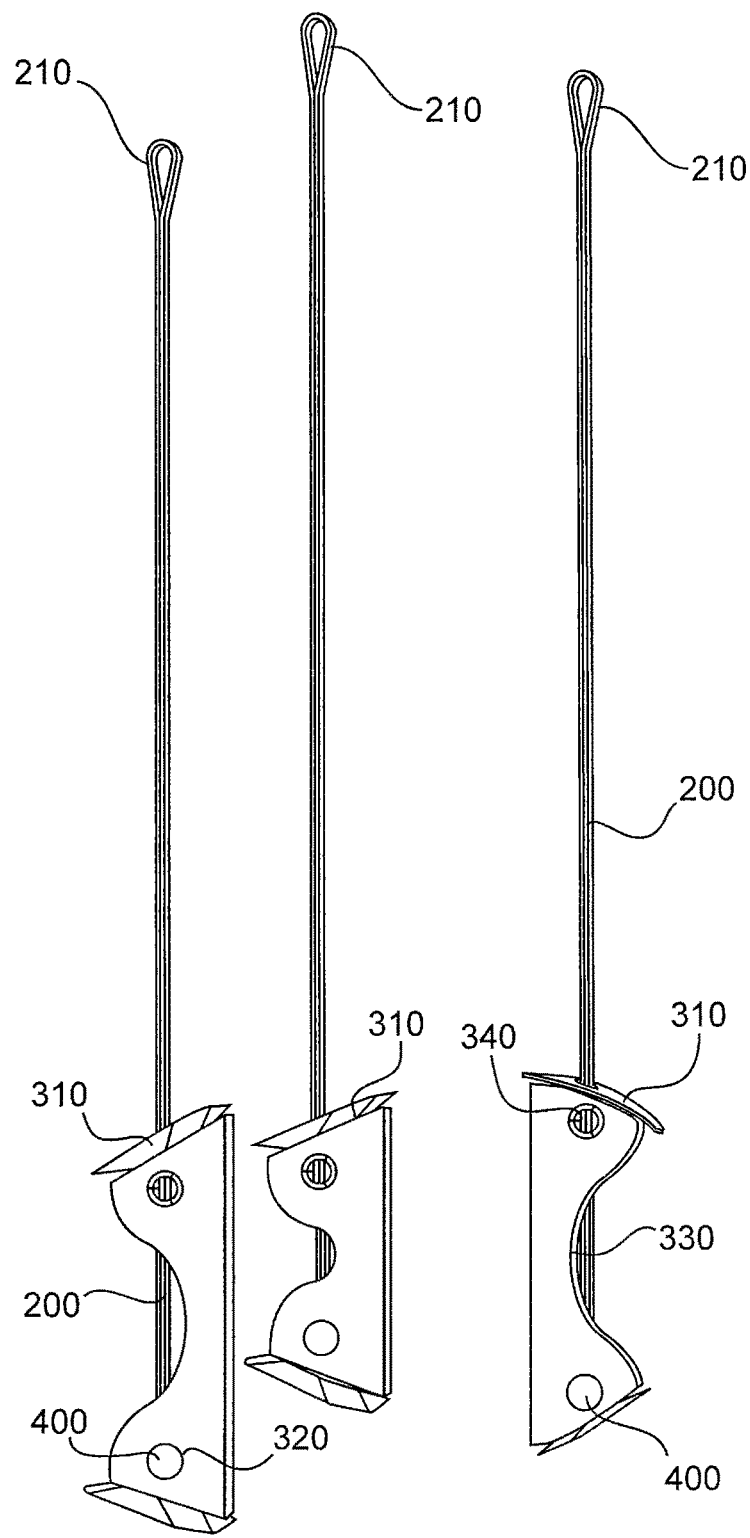
FIG. 7 shows a further perspective view of three fixing units each with slings in the second embodiment.

FIG. 7 shows a further perspective view of the fixing units 300 and the slings 200 of a wind power installation rotor blade according to the second embodiment. The fixing units each have two reinforcing plates 310, a first and a second hole 340 and a recess portion 330 in the central region. The slings 200 are introduced through a hole in the reinforcing plate 310 and fixed by means of a bolt 400 to or in the first hole 320.

Figure 8:
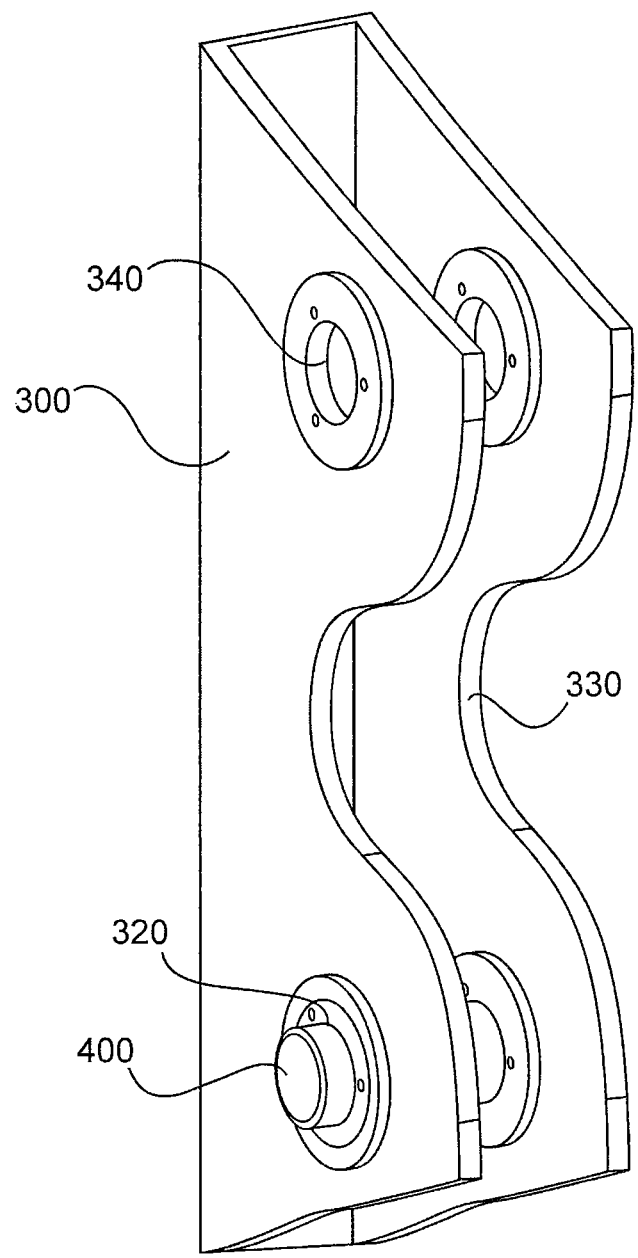
FIG. 8 shows a perspective view of a fixing unit for a rotor blade according to the second embodiment.

FIG. 8 shows a perspective view of a fixing unit for a rotor blade according to the second embodiment. The fixing unit 300 is for example of a U-shaped configuration in cross-section and thus has two first holes 320, two second holes 340 and two recess portions 330 in the central region between the first and second holes. A bolt 400 can be passed through the two first holes 320. That can serve for fixing the second eye of the sling 200.

Figure 9:
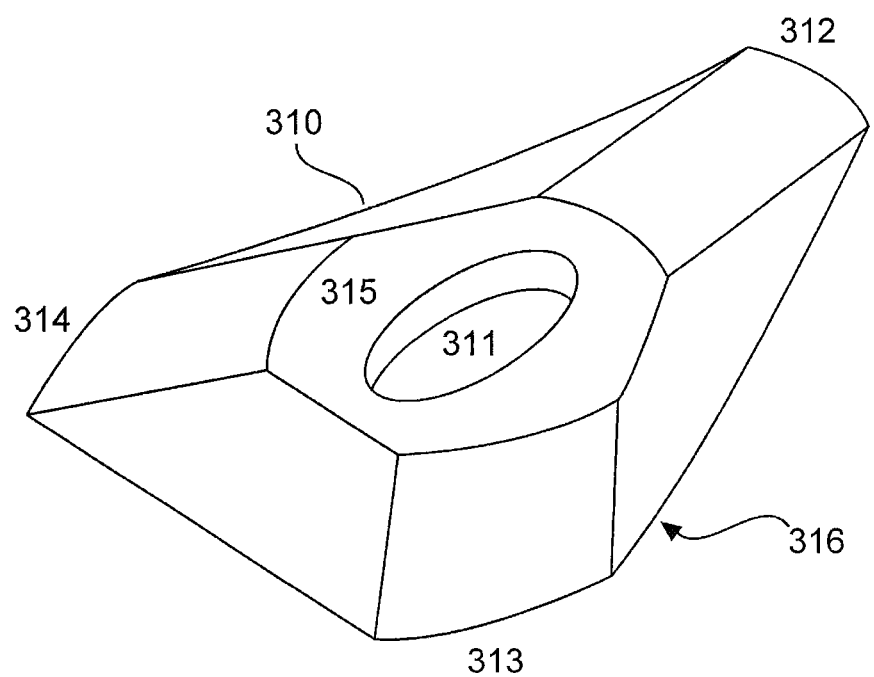
FIG. 9 shows a perspective view of a reinforcing plate for the fixing unit in the wind power installation rotor blade according to the second embodiment.

FIG. 9 shows a perspective view of a reinforcing plate of a fixing unit for a rotor blade according to the second embodiment. In its center the fixing plate has a through hole 311 for receiving the handling means, for example in the form of slings. The reinforcing plate further has a first side 315 and a second side 316. The reinforcing plate also has three ends 312, 313, 314. The reinforcing plate 310 is bonded into or to the outer casing for example in production of the rotor blade.

In the second embodiment the sling 200 is fixed in or to the first opening 320 by means of a bolt 400. That is particularly advantageous because that permits a better flow of forces. In that respect the second opening 320 represents the opening which faces downwardly and is opposite to the opening 190. The recess portion 330 serves for weight reduction. In addition that makes it possible to prevent an air flow through the interior 150 of the rotor blade being hindered. That air flow can be used for example for heating the rotor blade. In addition the recess portion can provide that a fitter can for example creep into the interior of the rotor blade for fitting or removal purposes.

Preferably the interior of the rotor blade in the region of the holes 190 is so large that a person can move therethrough to release the bolts 400 after fitment of the rotor blade has been completed. In addition that region is so great that a man can move therethrough to be able to inspect the interior of the rotor blade.

Optionally the fixing unit 300 is made from a non-metallic material like for example GRP or CRP. The bolt 400 can be made from metal.

The handling means or slings are preferably made from glass fiber and are soft so that they do not damage the rotor blade. A flexible elastic sleeve can be provided in the region of the opening 190 so that the slings do not damage the outer surface of the rotor blade in the region of the opening 190. After fitment of the rotor blade and after removal of the handling means the opening 190 can optionally be sealed off from the interior by a plug. Optionally a seal can be provided around the plug.

In an aspect of the invention a multi-part funnel, which can be fitted from the inside to extend outwardly, can be provided in the region of the opening 190. Then the slings are introduced through the opening 190 and fixed to the fixing unit 300. After rotor blade fitment the multi-part funnel can then be removed from the interior.

In an aspect of the invention for example three openings 190 are arranged around the center of gravity 600 of the rotor blade. Provided under the holes 190 are three fixing units between the suction side 130 and the pressure side 140.

When fitting the rotor blade, the first rotor blade is fitted by means of a first crane for example in a 3 o'clock position. For that purpose the three eyes 210 of the slings are suspended on a crane hook 700 so that the crane holds the rotor blade in the 3 o'clock position for fitting it. After fitting has been completed the rotor blade is lowered. In that case it can happen that only one of the slings is stressed while the other two slings are not. The result of this can be that the opening 190 and the fixing unit 300 to which the sling is fixed must carry the entire flow of forces for the rotor blade. Accordingly the openings 190 and the reinforcing plates 310 must be of a suitable design configuration.

When fitting the rotor blade, it is advantageous for the slings 200 to be removed only after fitment of the second rotor blade has been completed. For that purpose the rotor blade is rotated to such an extent that the next rotor blade can be fitted for example in the 9 o'clock position by means of a second crane. That makes it possible to ensure that the rotor blade does not move uncontrolledly downwardly when it rotates, and overshoots its position.

In an aspect of the invention, instead of two or three slings, it is possible to use a continuous sling of which one end is fixed to a first fixing unit and the second end is fixed to a second fixing unit.

In a further aspect of the invention belts for carrying the respective forces are provided along the longitudinal direction of the rotor blade. Reinforcing plates 310 are preferably connected to those belts to permit a good flow of forces.

The reinforcing plates have three ends 312, 313, 314 which are at an angle of 60° relative to each other. That is particularly advantageous in regard to the flow of forces.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wind power installation rotor blade comprising:
   a rotor blade root, a rotor blade tip, a rotor blade leading edge, a rotor blade trailing edge, a pressure side and a suction side;
   a rotor blade outer casing having a plurality of openings located in at least one of the pressure side and the suction side;
   a plurality of slings provided through the plurality of openings for fitting or removing the rotor blade to a wind power installation, wherein the plurality of slings include glass-fiber reinforced plastic or carbon-fiber reinforced plastic; and
   a plurality of fixing units coupled to the plurality of slings, respectively, wherein the plurality of fixing units are arranged in an interior of the rotor blade outer casing between the pressure side and the suction side, each of the plurality of fixing units having opposing ends that include first and second reinforcing plates that couple the fixing units to the outer casing, wherein each of the plurality of fixing units include an opening, wherein the plurality of slings are fixed to the plurality of fixing units by bolts that are introduced into openings of the plurality of slings and the openings of the plurality of fixing units.

2. The rotor blade according to claim 1 wherein the plurality of openings in the rotor blade outer casing is three openings, each of the three openings being proximate a center of gravity of the rotor blade.

3. The rotor blade according to claim 1 further comprising a plug to close at least one opening of the plurality of openings after the rotor blade has been fitted to the wind power installation.

4. The rotor blade according to claim 1 wherein each of the plurality of fixing units is of a symmetrical configuration.

5. A method of fitting wind power installation rotor blades to a wind power installation, comprising:
   providing ends of first slings through openings in an outer casing of a first rotor blade;
   fixing the ends of the first slings to a plurality of fixing units, respectively, wherein the plurality of fixing units is located in an interior of the first rotor blade, wherein the plurality of fixing units comprise first and second reinforcing plates at opposing ends that couple the plurality of fixing units to the outer casing, wherein plurality of fixing units comprise bolts that extend through openings in the plurality of fixing unit and the ends of the first slings;
   lifting the first rotor blade using the first slings and a first crane;
   fitting the first rotor blade to a first rotor blade connection of a pod of the wind power installation; lowering the first rotor blade using the first crane and the first slings to a lowered position;
   holding the first rotor blade in the lowered position using the first slings and the first crane;
   providing ends of second slings through openings in an outer casing of a second rotor blade;

fixing the second slings to fixing units, respectively, the fixing units located in an interior of the second rotor blade;

lifting the second rotor blade using the second slings and a second crane; and fitting the second rotor blade to a second rotor blade connection of the pod of the wind power installation, wherein the first rotor blade is held by the first slings and the first crane until the second rotor blade is fitted to the second rotor blade connection of the pod.

6. The method according to claim 5 wherein fitting the first rotor blade to the first rotor blade connection comprises fitting the first rotor blade to the first rotor blade connection while the first rotor blade is in a horizontal position.

7. The method according to claim 5 wherein lowering the first rotor blade by the first crane and the first slings includes causing the pod to be rotated.

8. An assembly comprising:

a rotor blade for a wind power installation, the rotor blade having a rotor blade body that includes a rotor blade root region, a rotor blade tip region, a rotor blade leading edge, a rotor blade trailing edge, a pressure side, and a suction side, at least one of the pressure side and the suction side having a plurality of openings;

a plurality of slings extending through the plurality of openings so that first portions of the plurality of slings are located in an interior of the rotor blade body and second portions of the plurality of slings are located outside of the rotor blade body, the second portions of the plurality of sling having ends configured to engage with a hook of a crane for lifting the rotor blade; and a plurality of fixing units located in the interior of the rotor blade body, the plurality of fixing units being configured to fix the plurality of slings to the rotor blade body, the plurality of fixing units having reinforcing plates at first and second ends that fix the plurality of fixing units to the interior of the rotor blade body, the plurality of fixing units including openings and bolts, wherein the bolts extend through the openings of the plurality of fixing units and the plurality of openings in the plurality of slings, respectively, to fix the plurality of slings to the rotor blade body.

9. The assembly according to claim 8 wherein the plurality of openings are located proximate a center of gravity of the rotor blade body.

10. The assembly according to claim 8 wherein each of the plurality of slings include an eye at an end of the first portion and each of the plurality of fixing units includes an opening, and wherein the plurality of fixing units further include fasteners configured to be placed through the eye of a respective one of the plurality of slings and through the opening of the respective fixing unit to fix the respective sling to the rotor blade body.

11. The assembly according to claim 9 further comprising a plug to close at least one opening of the plurality of openings when the plurality of slings are not extending therethrough.

12. The assembly according to claim 8 wherein the ends of the second portions of the plurality of slings includes eyes configured to receive the hook of the crane for lifting the rotor blade.

* * * * *